(12) United States Patent
Arthofer

(10) Patent No.: US 12,458,935 B2
(45) Date of Patent: *Nov. 4, 2025

(54) APPARATUS, SYSTEMS AND METHODS FOR ON SITE MIXING

(71) Applicant: Mark Arthofer, Dubuque, IA (US)

(72) Inventor: Mark Arthofer, Dubuque, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,622

(22) Filed: Apr. 18, 2024

(65) Prior Publication Data

US 2024/0278197 A1   Aug. 22, 2024

Related U.S. Application Data

(63) Continuation of application No. 16/555,447, filed on Aug. 29, 2019, now Pat. No. 11,986,782.

(60) Provisional application No. 62/724,286, filed on Aug. 29, 2018.

(51) Int. Cl.
| | | |
|---|---|---|
| *B01F 23/00* | (2022.01) | |
| *B01F 21/00* | (2022.01) | |
| *B01F 23/50* | (2022.01) | |
| *B01F 33/502* | (2022.01) | |
| *B01F 35/221* | (2022.01) | |
| *B01F 35/71* | (2022.01) | |
| *B01F 35/75* | (2022.01) | |

(52) U.S. Cl.
CPC .............. *B01F 23/59* (2022.01); *B01F 21/30* (2022.01); *B01F 33/5023* (2022.01); *B01F 35/2211* (2022.01); *B01F 35/71731* (2022.01); *B01F 35/71775* (2022.01); *B01F 35/754551* (2022.01)

(58) Field of Classification Search
CPC . B01F 23/59; B01F 33/5023; B01F 35/71731
See application file for complete search history.

(56) References Cited

U.S. PATENT DOCUMENTS

| | | | |
|---|---|---|---|
| 4,298,288 A * | 11/1981 | Weisbrod | B28C 9/0454 366/11 |
| 6,299,793 B1 | 10/2001 | Hartley et al. | |
| 6,398,979 B2 | 6/2002 | Koefod et al. | |
| 6,436,310 B1 | 8/2002 | Hartley et al. | |
| 6,440,325 B1 | 8/2002 | Hartley et al. | |
| 6,582,622 B1 | 6/2003 | Hartley et al. | |
| 6,596,188 B1 | 7/2003 | Hartley et al. | |
| 6,599,440 B2 | 7/2003 | Hartley et al. | |
| 6,770,217 B2 | 8/2004 | Hartley et al. | |
| 6,805,811 B2 | 10/2004 | Hartley et al. | |
| 6,827,873 B2 | 12/2004 | Hartley et al. | |
| 6,905,631 B2 | 6/2005 | Hartley et al. | |
| 7,147,797 B2 | 12/2006 | Koefod et al. | |
| 10,456,762 B1 | 10/2019 | Weiss et al. | |
| 11,986,782 B2 * | 5/2024 | Arthofer | B01F 23/59 |
| 2015/0103614 A1 * | 4/2015 | Brock | B01F 35/71775 366/3 |

* cited by examiner

*Primary Examiner* — Anshu Bhatia
(74) *Attorney, Agent, or Firm* — DENTONS DAVIS BROWN PC; Matthew Warner-Blankenship

(57) ABSTRACT

The disclosed apparatus, systems and methods relate to devices, systems and methods for mixing particulate matter such as salt with moisture. In various implementations, the mixer is transportable. In various implementations the mixer comprises a hopper, at least one auger, and a mixing housing. Various implementations, additionally include at least one liquid tank.

19 Claims, 20 Drawing Sheets

APPARATUS, SYSTEMS AND METHODS FOR ON SITE MIXING

CROSS REFERENCE TO RELATED APPLICATION

This application is a continuation of U.S. patent application Ser. No. 16/555,447, filed Aug. 29, 2019, which claims the benefit under 35 U.S.C. § 119(e) to U.S. Provisional Application No. 62/724,286, filed Aug. 29, 2018, and entitled "Apparatus, Systems and Methods for On Site Mixing," each of which is hereby incorporated by reference in their entirety for all purposes.

TECHNICAL FIELD

The disclosed technology relates generally to mixing and in particular, to the devices, methods, and systems allowing for on-site mixing. This has implications in a number of industrial and commercial settings, including in the mixing of particulate substances such as salt, sand, and chips for use on roads.

BACKGROUND

The disclosure relates to devices, systems and methods for mixing of particulate substances. More particularly to the mixing of particulate substances, such as sand and salt, and incorporating a liquid into the particulate substances.

There is a need in the art for devices, systems, and methods for mixing and creating uniform mixtures of various particulate substances and liquids.

BRIEF SUMMARY

Discussed herein are various devices, systems and methods relating to a device and associated systems and methods for use in the mixing and wetting of particulates and/or liquids. One Example includes a mixer including a hopper; a first auger operatively connected to the hopper; a mixing housing in communication with the first auger; a liquid tank in fluid communication with the mixing housing; and a second auger operatively engaged with the mixing housing, where: the first auger conveys a material from the hopper to the mixing housing; the material is combined with a solution from the liquid tank in the mixing housing; and the combined material is conveyed out of the mixing housing by the second auger. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions.

Implementations may include one or more of the following features. The mixer where the mixer is disposed on a trailer. The mixer where the second auger is a stacking auger including a first portion and a second portion. The mixer where the stacking auger further includes a joint between the first portion and the second portion and where in the joint is articulated via a hydraulic system. The mixer further including a control system. The mixer where the control system controls at least one of the material throughput and solution application. The mixer where the material is salt and the solution is a mixture of distilled concentrated solutes and magnesium chloride.

Another Example includes a mixer including: a hopper, at least one auger, a mixer including at least one liquid port, and at least one liquid tank in fluid communication with the at least one liquid port.

Various implementations may include one or more of the following features. The mixer further including a power source. The mixer further including a hydraulic system powered by the power source. The mixer where the mixer is disposed on a trailer. The mixer further including at least one of a catwalk, a fender, a ladder, and a step. The mixer where the hopper further includes extendable sides. The mixer where the trailer is towable.

Another Example includes a mixing system including: a mixer including: a hopper; a first auger; a second auger; and at least one liquid port, where: the first auger mixes a particulate substance; the at least one liquid port applies a solution to the particulate substance; and the second auger conveys the particulate substance out of the mixer.

Implementations may include one or more of the following features. The mixing system where the particulates include at least one of sand, salt, and chips. The mixing system where the solution includes distilled concentrated solutes. The mixing system where the solution further includes magnesium chloride. The mixing system where the distilled concentrated solutes and magnesium chloride are present in the solution at a ratio of about 50:50. The mixing system where the mixer processes between 50 and 200 tons of the particulate substance per hour.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to various devices, systems, and methods relating to a mixer and associated systems and methods for use. Namely, certain implementations relate to a mixing device, for example a mobile mixing device, that can be used to combine various components on site for immediate or later use.

Figure 1A:
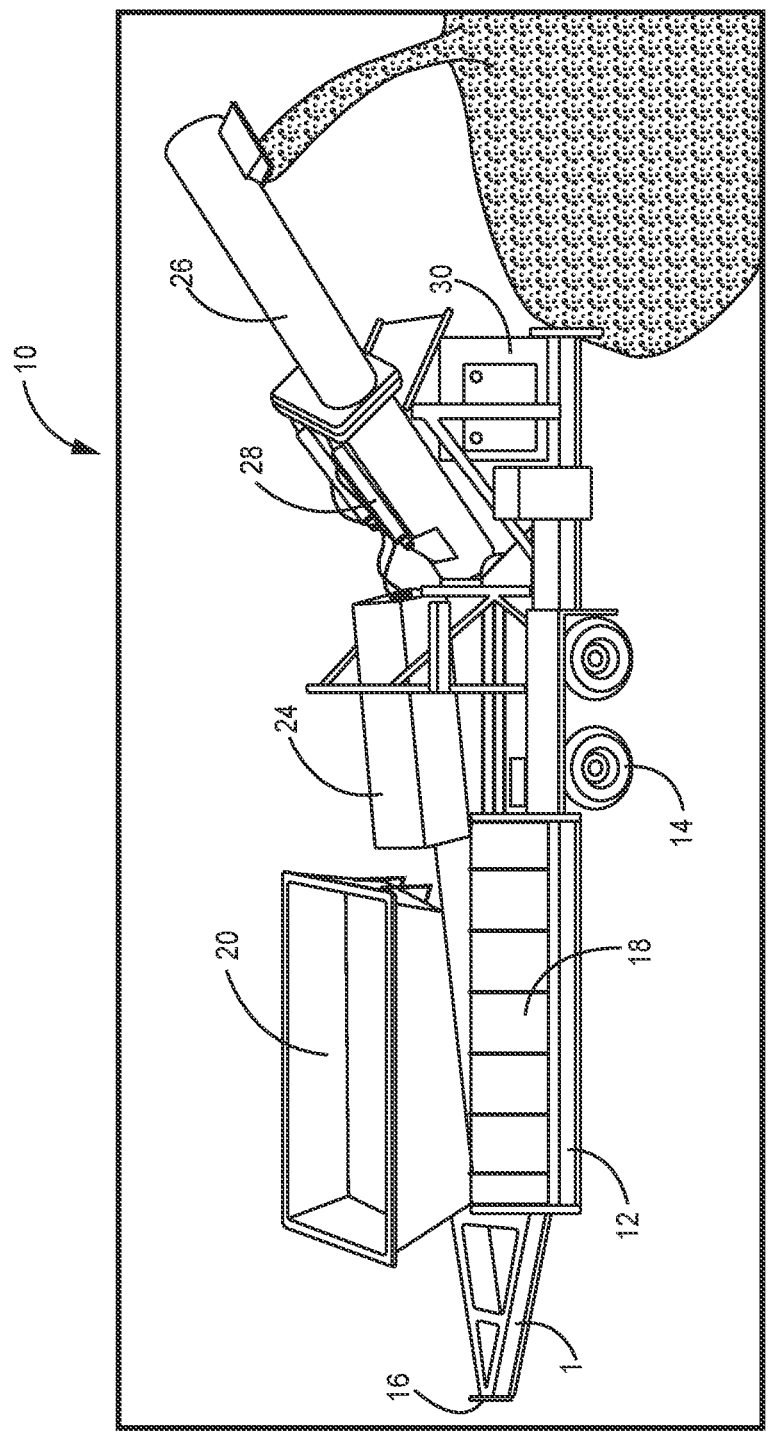
FIG. 1A is a perspective view of a mixer, according to one implementation.
Figure 1B:
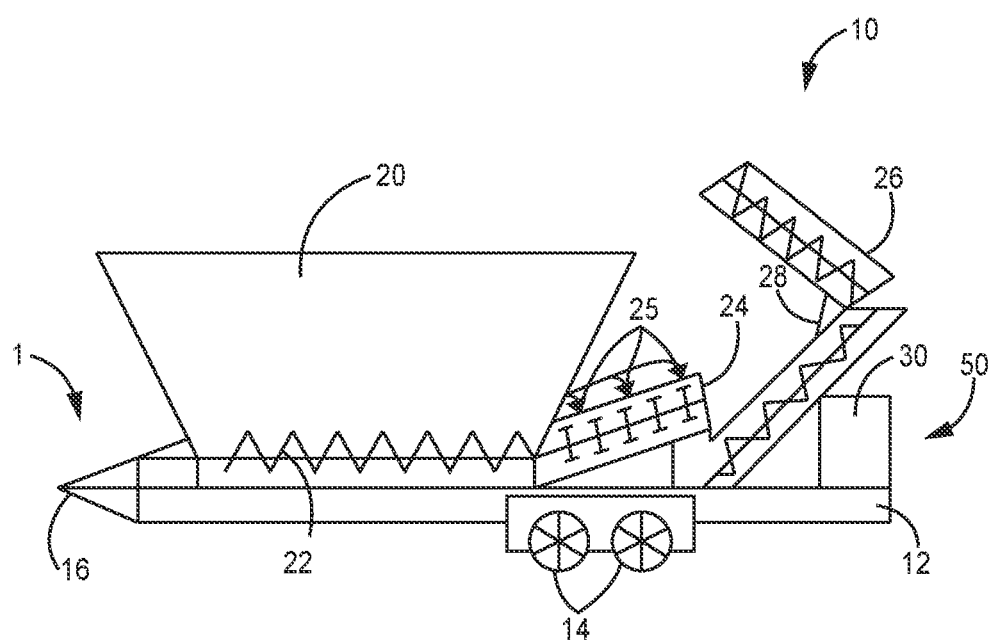
FIG. 1B is a cross-sectional schematic side view of a mixer, according to one implementation.
Figure 2:
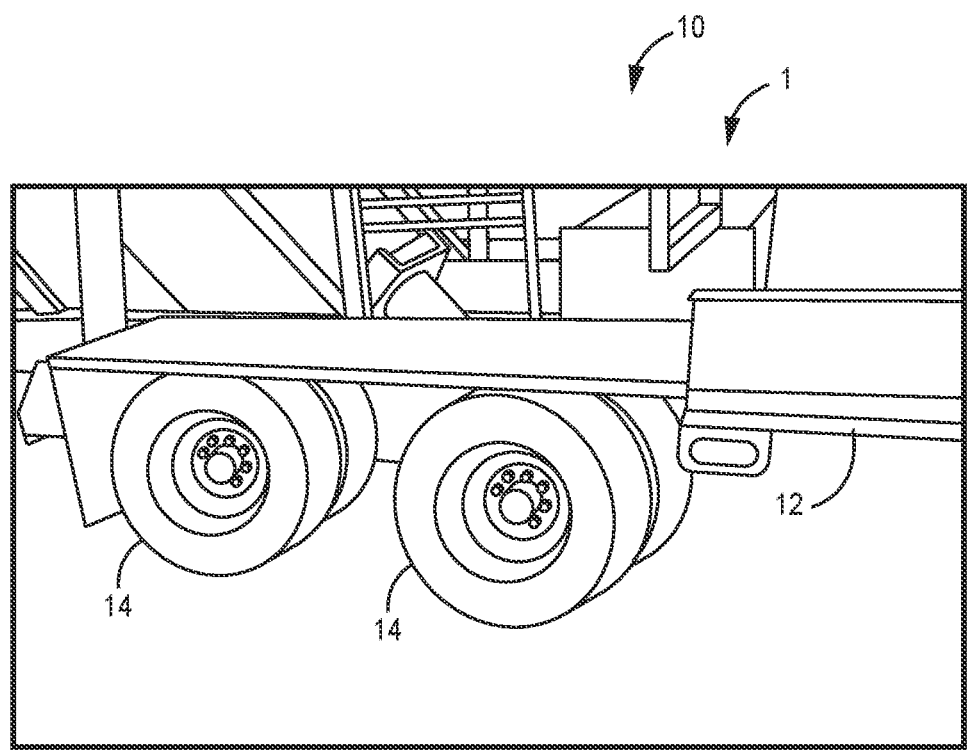
FIG. 2 depicts wheels of the mixer, according to one implementation.
Figure 3:
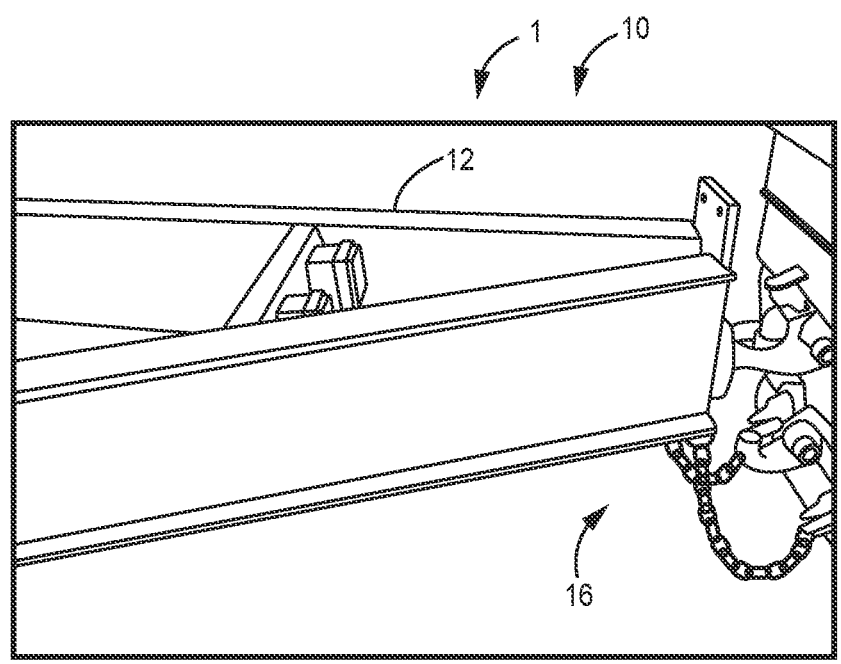
FIG. 3 depicts the trailer coupling, according to one implementation.

Turning to the drawings in greater detail, FIGS. 1A and 1B depict an exemplary embodiment of the mixer 10. The mixer 10 has a support frame 12, such as a trailer 1. In some implementations, the trailer 1 is supported by at least one wheel 14, and can be attached to a towing vehicle via a coupling 16, as would be understood by one of skill in the art. Exemplary wheels 14 and a coupling 16 are shown in further detail in FIGS. 2 and 3 respectively.

Figure 4:
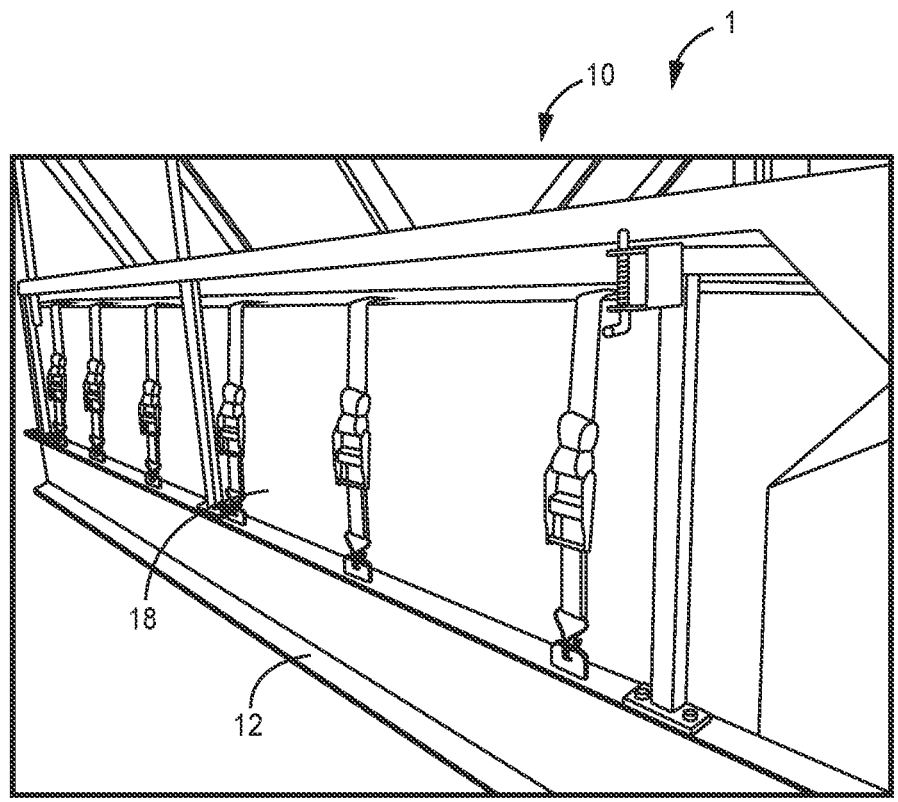
FIG. 4 depicts a liquid storage tank, according to one implementation.

In various implementations, the mixer 10 comprises a storage tank 18, such as a liquid storage tank 18, shown in FIG. 4. In some implementations, the mixer 10 has two storage tanks 18, one on each side of the trailer 1, flanking a hopper 20, as would be readily appreciated. In an exemplary implementation, a 1000 gallon tank is used. In various alternative implementations, two 400 gallon liquid tanks are used. As would be appreciated by those of skill in the art, a wide range of commercially available or custom tanks could be used with capacities ranging from 1 gallon to 5,000 gallons or more.

Figure 5:
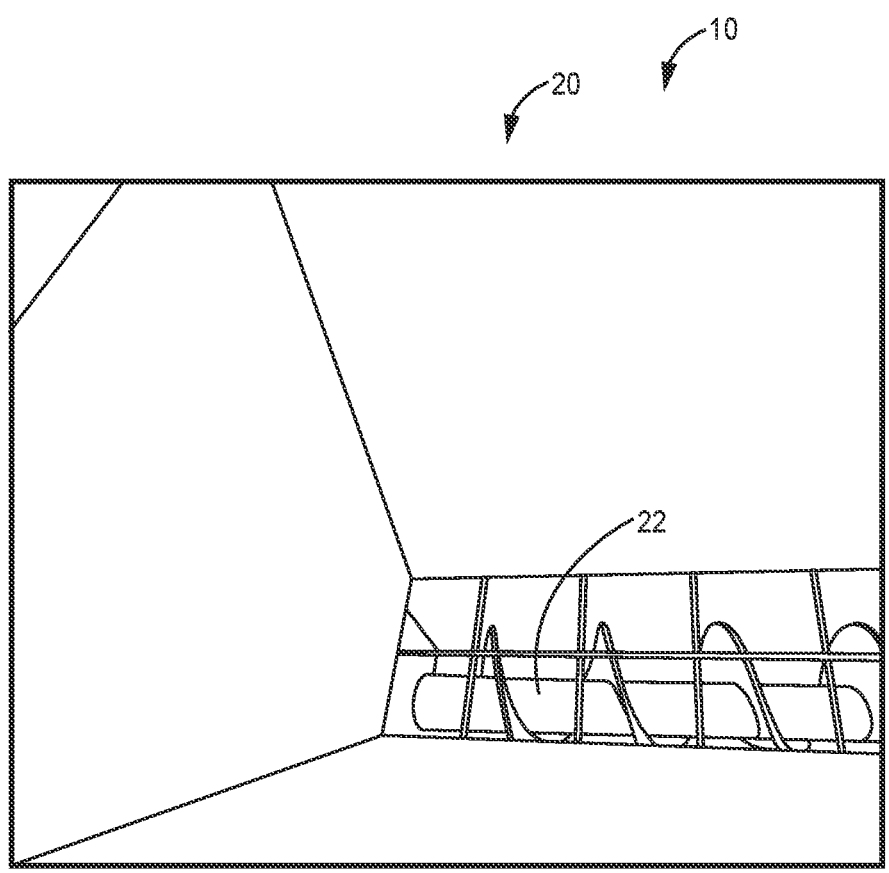
FIG. 5 depicts the interior of the hopper and auger, according to one implementation.
Figure 6:
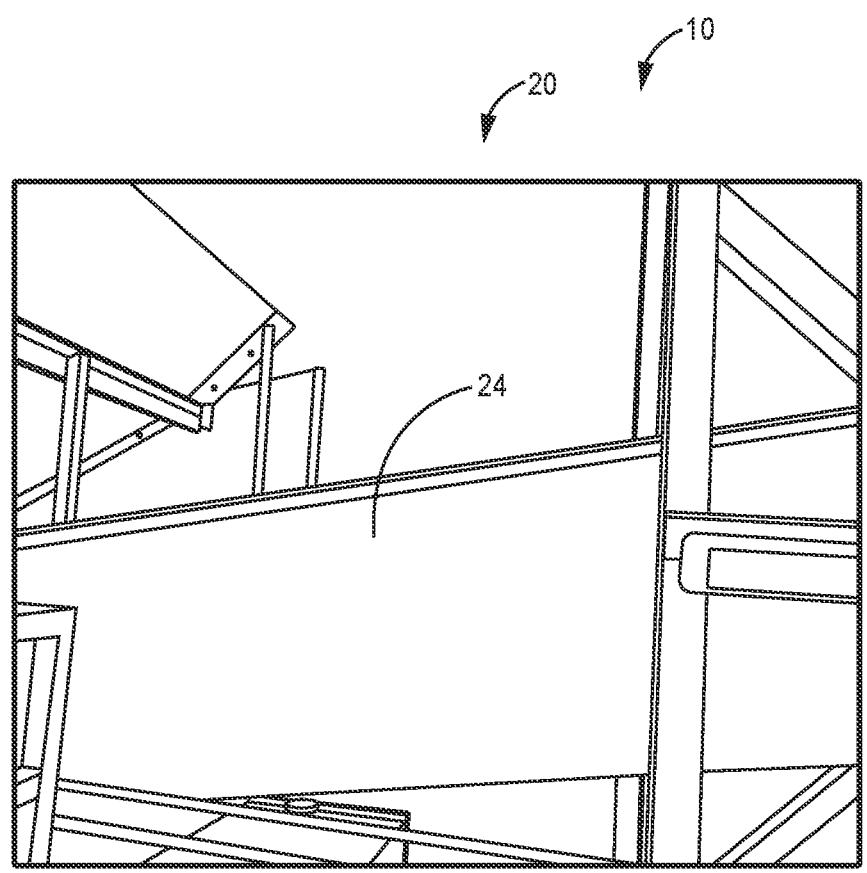
FIG. 6 depicts a mixing housing, according to one implementation.

Continuing with FIGS. 1A and 1B, and as shown in FIG. 5, in various implementations a hopper 20 and at least one auger 22 are provided. In certain implementations, the auger 22 or augers 22 are hydraulically driven, and are configured to drive material from the hopper 20 to a mixing housing 24 such as a pug mill 24, shown in FIG. 6. Those of skill in the art would appreciate that the mixing housing 24 may comprise any known device capable of mixing/admixing the material from the hopper 20.

In certain implementations, the pug mill 24 is in mechanical or otherwise driven communication with an actuator via a drive chain or other system configured to cause the admixing material and rotation of the pug mill 24. In various implementations, an actuator can be driven or otherwise controlled by way of the hydraulic system 40 or other known actuation and control systems that can in turn be operated by way of the control and/or monitoring system 50.

Figure 7:
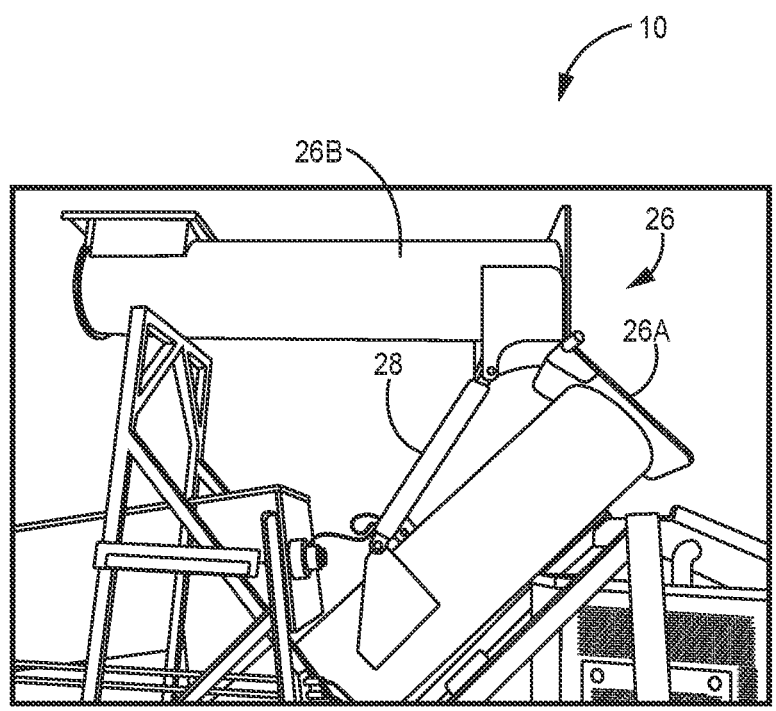
FIG. 7 depicts a stacking auger, according to one implementation.
Figure 8:
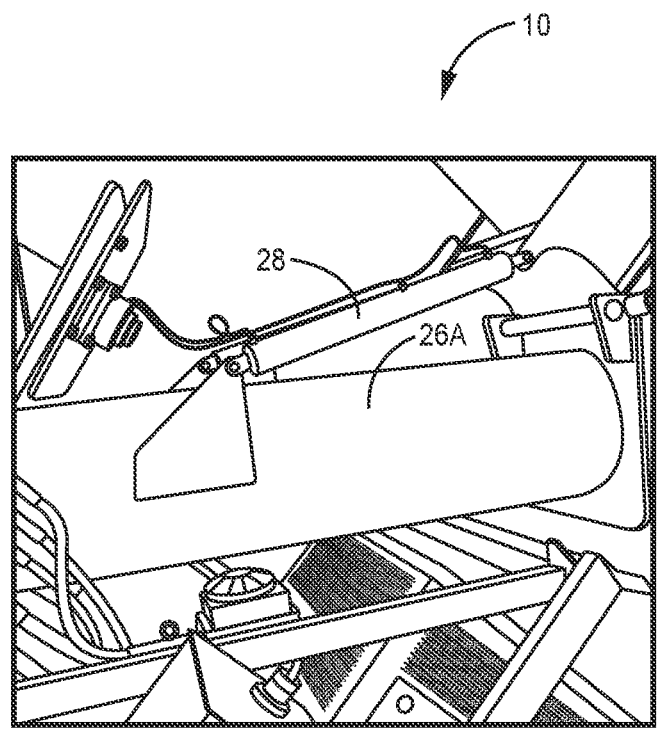
FIG. 8 depicts the lower portion of a stacking auger, according to one implementation.

In various implementations, the mixer 10 has a conveying auger 26 in communication with the mixing housing 24. In various of these implementations, the conveying auger 26 is a stacking auger 26, as shown in FIGS. 7 and 8. In implementations with the stacking auger 26, the stacking auger 26 has at least two portions and lower portion 26A and an upper portion 26B. The upper portion 26B of the stacking auger 26 may be articulated about a joint to be moved between an extended position and a retracted/stowed position. The upper portion 26B may be urged into alignment with the lower portion 26A via a hydraulic mechanism, such as hydraulic cylinder lifting booms 28. In various alternative implementations, the upper portion 26B may be articulated about the joint via any other mechanism, as would be understood by those of skill in the art.

In various alternative implementations, the pug mill 24 is in fluidic communication with a conveyor, so as to allow treated and mixed product to be passed to a further storage location, as would be understood.

Figure 9:
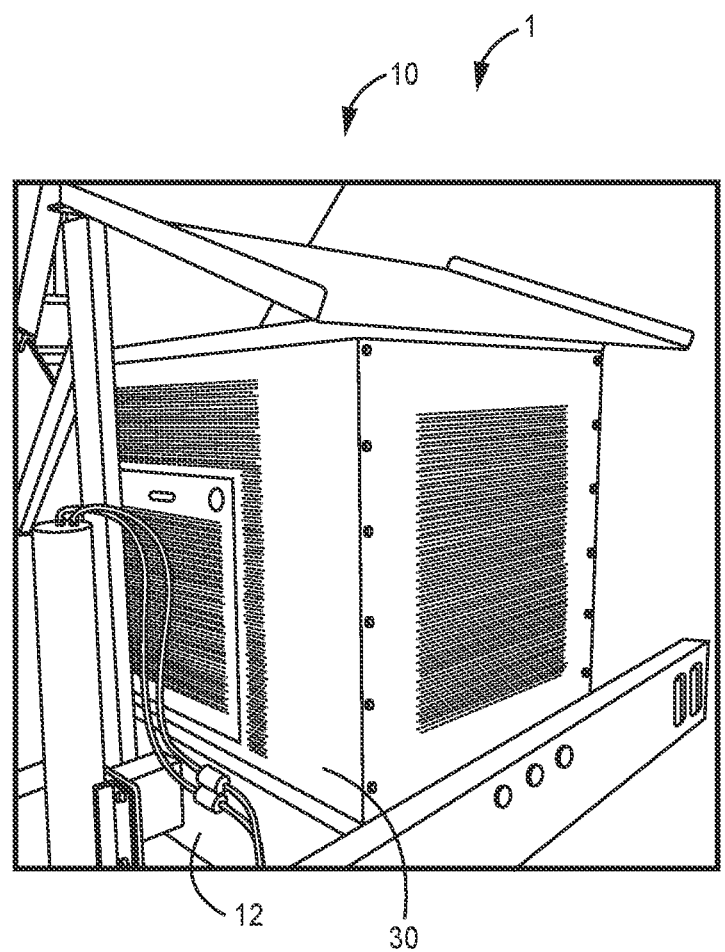
FIG. 9 depicts a power source, according to one implementation.
Figure 10:
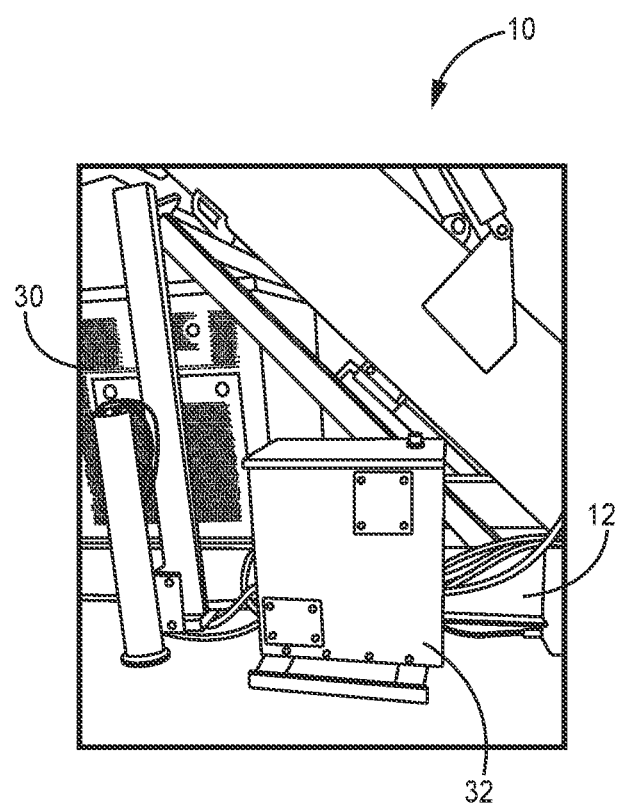
FIG. 10 depicts a diesel exhaust fluid tank, according to one implementation.
Figure 11:
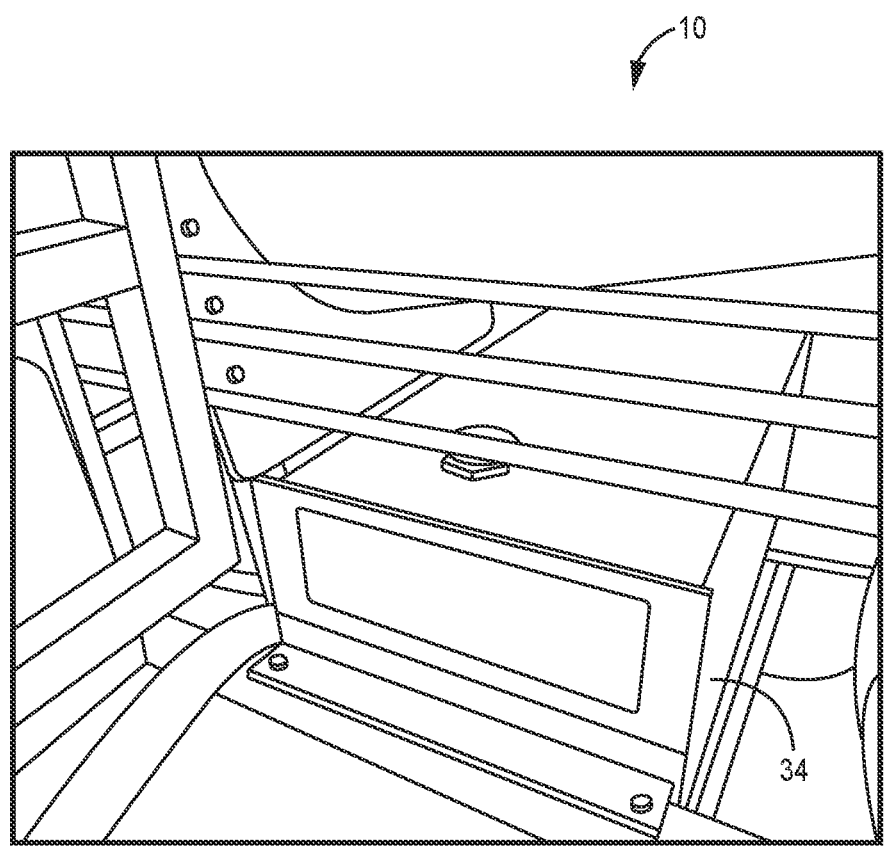
FIG. 11 depicts a diesel fuel tank, according to one implementation.

In various implementations, a power source 30 is provided and is in operational communication with the drive train of augers 22 to power them, such as via hydraulic pumps or other known power sources. In various implementations, the power source 30 is a diesel engine 30, as shown in FIG. 9. In implementations having a diesel engine 30 a diesel exhaust fluid tank 32 is provided in operational communication with the diesel engine, as shown best in FIG. 10. Further a diesel fuel tank 34, shown in FIG. 11, may additionally be provided on the mixer 10.

In these and other implementations the diesel engine 30 is a 175 horse power (hp) diesel motor. Of course various alternative power sources 30 may be implemented as would be appreciated, ranging from 1 hp to 500 hp or more.

Figure 12:
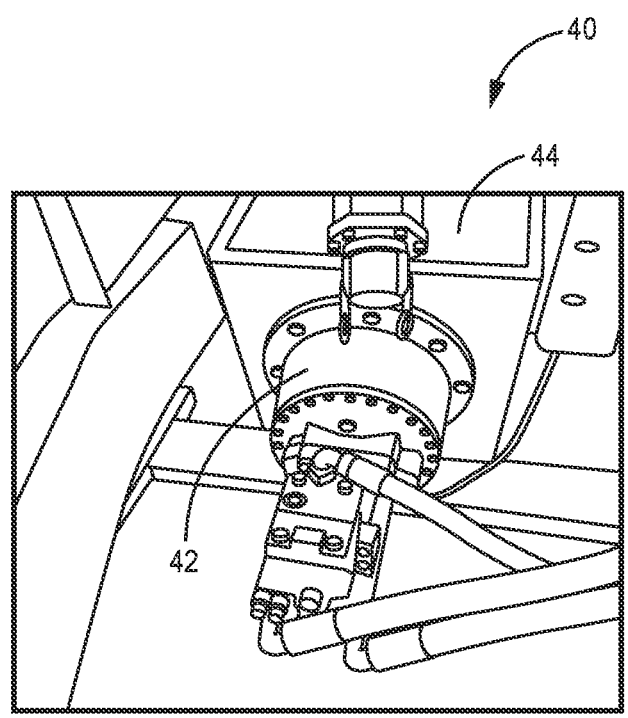
FIG. 12 depicts a hydraulic system, according to one implementation.
Figure 13:
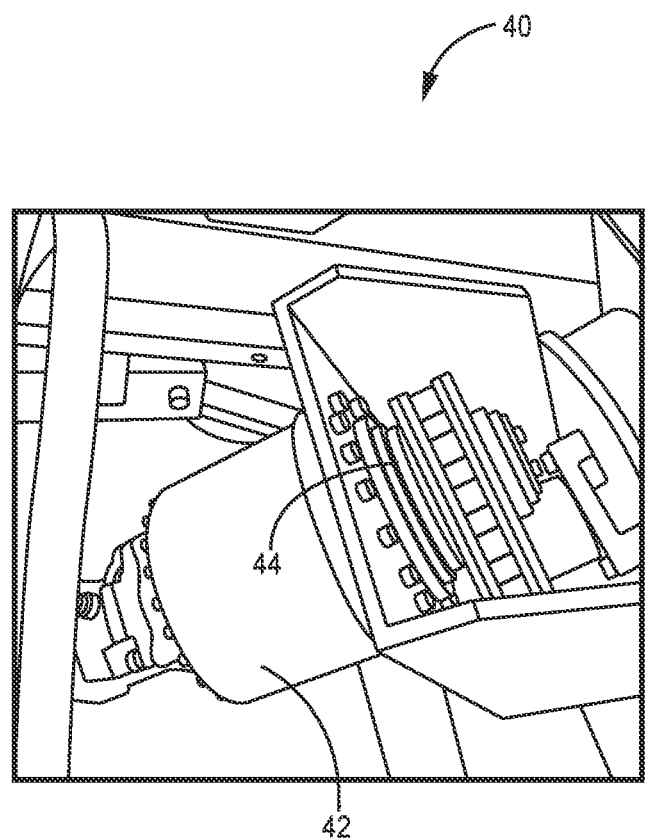
FIG. 13 depicts a hydraulic system, according to one implementation.
Figure 14:
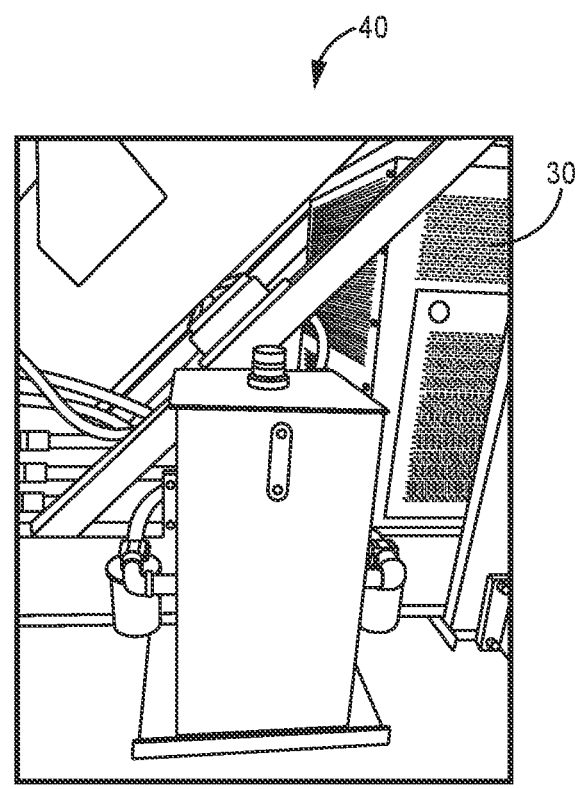
FIG. 14 depicts a hydraulic tank, according to one implementation.

The power source 30 is in operational communication with a hydraulic system 40 to power the mixing auger 22 and conveying auger 26. The hydraulic system 40 may comprise a hydraulic motor 42 and gear box 44, as shown in FIGS. 12 and 13. The hydraulic system 40 may also include a hydraulic tank 46, shown in FIG. 14.

In use according to various implementations, particulate matter, such as salt, sand and/or other grains, is placed into the hopper 20 where it collects and is driven toward the pug mill 24 via the drive train of auger 22 for mixing/admixing. In various implementations, the pug mill 24 comprises several spigots or nozzles 25, shown in FIG. 1B, configured to mix/admix and apply a solution from the liquid tank 18 to the particulate matter introduced into the hopper 20 and transitioned to the pug mill 24 via the mixing auger 22.

In one specific implementation, sand and salt can be introduced into the hopper 20 and sprayed with a mixture of distilled concentrated solutes ("DSC") and magnesium chloride and mixed in the pug mill 24. It would be understood that DSC is a byproduct derived from the distillation of rum and/or vodka and can be stored in the liquid storage tank(s) 18. In various implementations, the liquid storage tank(s) 18 holds a mixture of DSC and magnesium chloride in a ratio of 50:50.

Figure 15:
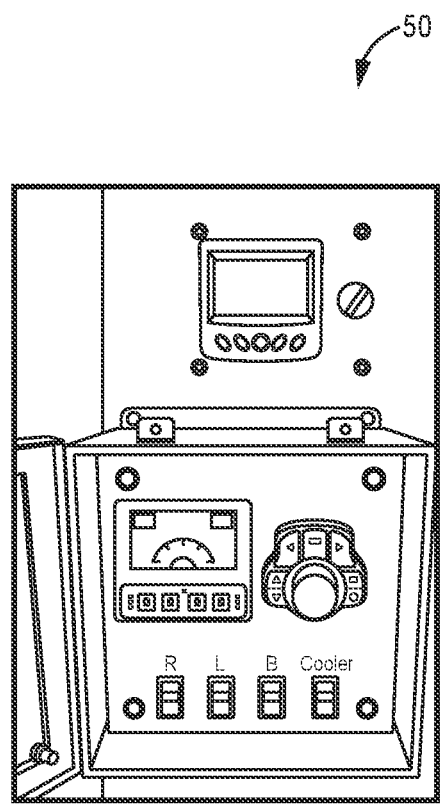
FIG. 15 depicts a control panel, according to one implementation.
Figure 16:
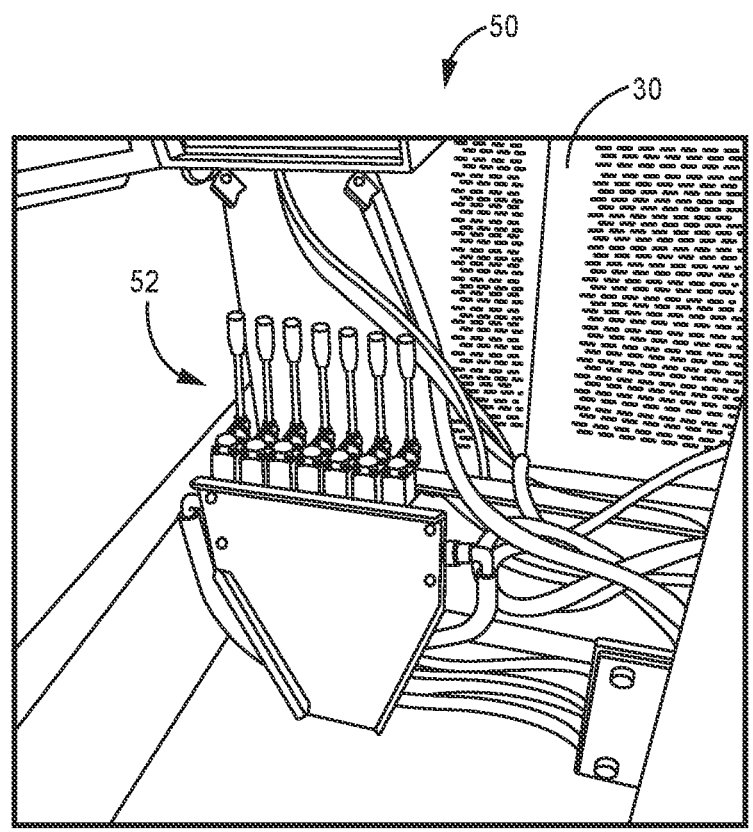
FIG. 16 depicts exemplary controls.

In certain implementations, shown in FIGS. 15 and 16, the mixing housing/pug mill 24 is fitted with a control and/or monitoring system 50 or moisture tester such that the user can assess the moisture content and mixing efficacy of the particulate matter. Various implementations include a custom control and monitoring system 50. Further various implementations have controls 52 disposed on the mixer 10 and in fluidic or electronic communication with the monitoring system 50, hydraulic systems 40, the power source 30 and other essential components so as to provide input and other control functions and otherwise operate the various components.

In additional implementations, the controls can be integrated with operations systems and computers, such that automatic mixing and timing protocols can be executed. That is, in one implementation, a user can enter an amount, such as a weight, into a control panel, and the mixer 10 will automatically operate and mix for a pre-determined amount of time for that weight. In further implementations, machine learning can be employed to improve functionality of the mixer.

In various implementations, the mixer has a throughput of between 50 and 200 tons of particulate matter per hour.

Further, in certain implementations the mixer 10 has one or more stabilizers (not shown), such as out-riggers, that can be disposed along the support frame 12 so as to provide additional support to the mixer 10 while in use. In some implementations, the mixer has four outriggers, one on each corner of the trailer 1 or support frame 12 to provide stabilization and support to the mixer.

Figure 17:
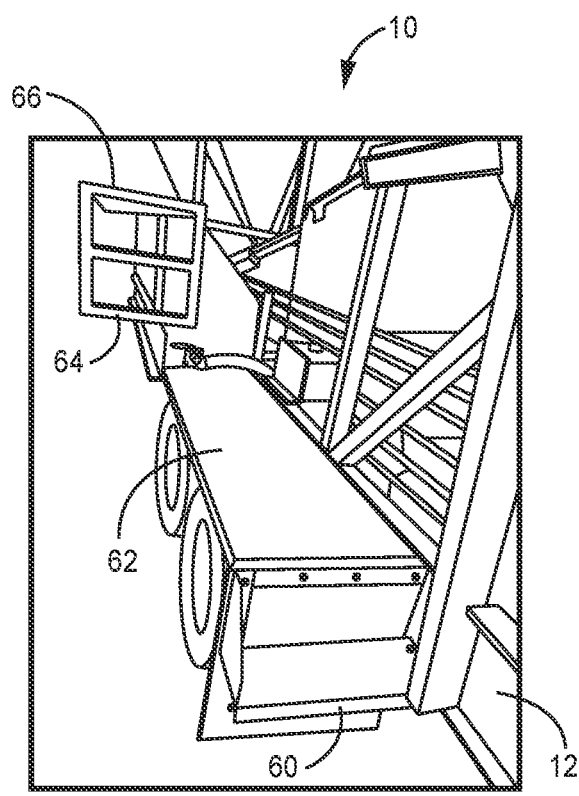
FIG. 17 shows various optional additional components on the mixer.
Figure 18:
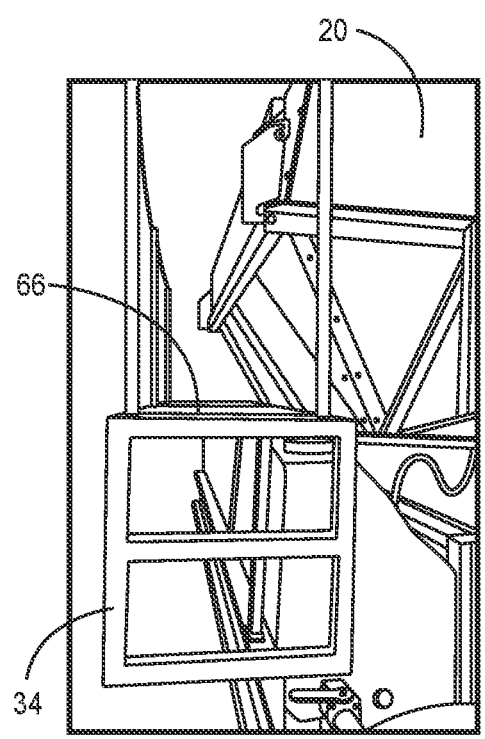
FIG. 18 shows various optional additional components on the mixer.
Figure 19:
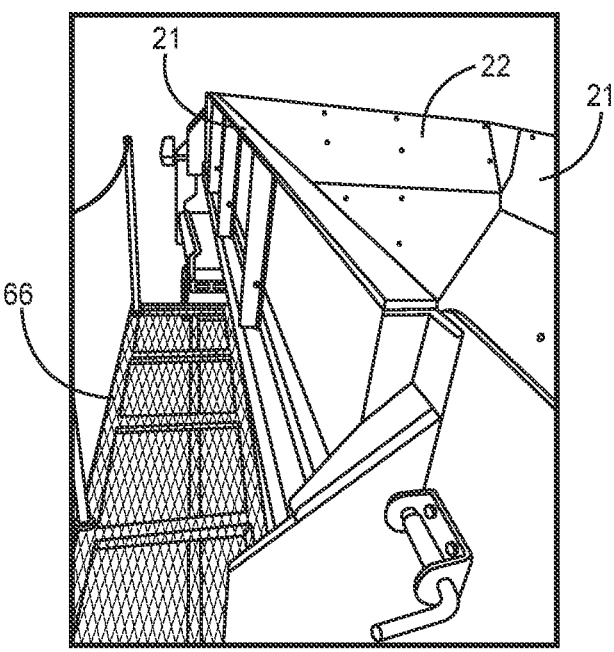
FIG. 19 depicts the hopper with extendable sides, according to one implementation.

The mixer 10 may comprise various additional features including a step 60, a fender 62, a ladder 64, and/or a catwalk 66 for accessing the hopper 20 and various other components of the mixer 10, shown in FIGS. 17 and 18. In some implementations, the sides 21 of the hopper 20 are extendable and therefor increase the capacity of the hopper 20, as shown in FIG. 19.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Although the disclosure has been described with reference to preferred embodiments, persons skilled in the art will recognize that changes may be made in form and detail without departing from the spirit and scope of the disclosed apparatus, systems and methods.

What is claimed is:

1. A mixer comprising:
   (a) a first auger configured to convey salt;
   (b) a mixing housing in communication with the first auger;
   (c) a liquid tank in fluid communication with the mixing housing, wherein the liquid tank holds a solution comprising distilled concentrated solutes;
   (d) a second auger operatively engaged with the mixing housing configured to convey mixed material from the mixing housing; and
   (e) a monitoring system configured to monitor and control components of the mixer and assess moisture content and mixing efficacy of the mixed material to achieve a uniform mixture, wherein the monitoring system controls at least one of the material throughput and solution application.

2. The mixer of claim 1, wherein the mixer is disposed on a trailer.

3. The mixer of claim 1, wherein the second auger is a stacking auger, the stacking auger comprising a first portion and a second portion.

4. The mixer of claim 3, wherein the stacking auger further comprises a joint between the first portion and the second portion and wherein the joint is articulated via a hydraulic system.

5. The mixer of claim 1, further comprising a hydraulic system configured to operate the first auger and the second auger.

6. The mixer of claim 5, wherein the hydraulic system comprises one or more hydraulic pumps and motors.

7. The mixer of claim 1, wherein the solution further comprises magnesium chloride.

8. A mixer comprising:
   (a) at least one auger configured to convey a particulate substance;
   (b) a mixer housing comprising at least one liquid port, wherein the mixer housing is configured in line with the at least one auger to receive the particulate substance that is conveyed into the mixer housing by the at least one auger;
   (c) at least one liquid tank in fluid communication with the at least one liquid port on the mixer housing, wherein liquid from the at least one liquid tank is applied to material in the mixer housing;
   (d) a conveying auger in communication with the mixer housing to convey mixed material from the mixer housing; and
   (e) a control system in communication with the mixer housing configured to assess moisture content and mixing efficacy of the material and liquid,
   wherein the liquid comprises distilled concentrated solutes.

9. The mixer of claim 8, further comprising a hydraulic system powered by a power source, the hydraulic system configured to operate the at least one auger.

10. The mixer of claim 9, wherein the hydraulic system comprises at least one hydraulic motor and at least one hydraulic pump.

11. The mixer of claim 8, wherein the mixer is disposed on a trailer.

12. The mixer of claim 11, wherein the trailer is towable.

13. The mixer of claim 10, further comprising a hopper, wherein the first auger is disposed within the hopper.

14. A mixing system comprising:
   a mixer comprising:
   (a) a first auger configured to convey and mix the at least one particulate substance;
   (b) a mixing housing in communication with the first auger for receiving the at least one particulate substance;
   (c) a second auger in communication with the mixing housing configured to covey the particulate substance from the mixing housing;
   (d) at least one liquid port on the mixing housing for introducing a liquid into the mixing housing and applying the liquid to the at least one particulate substance; and
   (e) a control and monitoring system configured to monitor and assess moisture content and mixing efficacy and execute automatic mixing and timing protocols.

15. The mixing system of claim 14, further comprising a hydraulic system comprising at least two hydraulic motors and at least one hydraulic pump configured to operate the first auger and the second auger.

16. The mixing system of claim 15, wherein the first auger and the second auger are connected to the at least two hydraulic motors by at least two gearboxes.

17. The mixing system of claim 14, wherein the at least one particular substance is one or more of salt, sand, and chip and the liquid further comprises magnesium chloride.

18. The mixing system of claim 17, wherein the liquid comprises distilled concentrated solutes and magnesium chloride present at a ratio of about 50:50.

19. The mixing system of claim 18, wherein the mixer is configured to process between about 50 and 200 tons of the at least one particulate substance per hour.

* * * * *